March 7, 1967 D. S. COCHRAN 3,308,400
FREQUENCY ADJUSTMENT CIRCUIT
Filed June 13, 1962
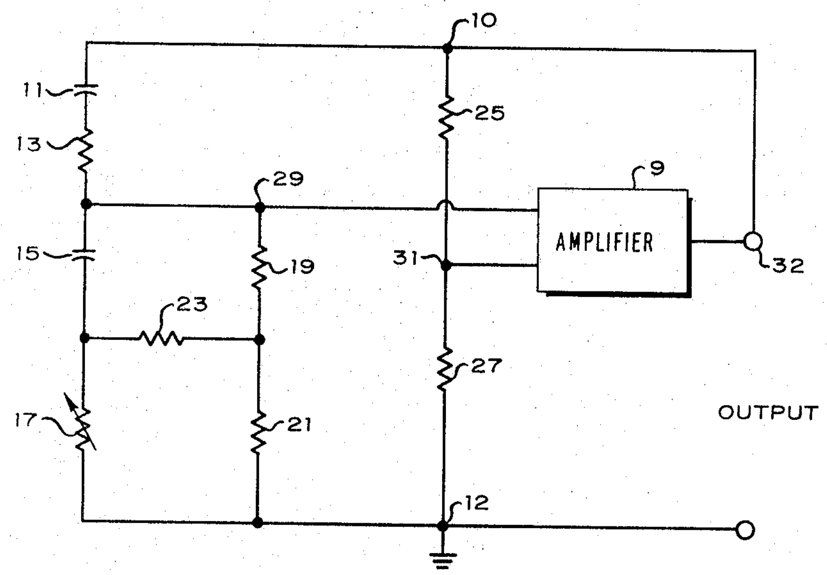
INVENTOR
DAVID S. COCHRAN
BY J. I. Chapman
ATTORNEY 3,308,400
FREQUENCY ADJUSTMENT CIRCUIT David S. Cochran, Palo Alto, Calif., assignor to Hewlett-Packard Company, Palo Alto, Calif., a corporation of California Filed June 13, 1962, Ser. No. 202,195
4 Claims. (Cl. 333—75)

This invention relates to a circuit for making fine adjustments in the frequency of a bridge-type oscillator and more particularly to a circuit for producing small shifts in the frequency selection of a bridge circuit without disturbing the bridge balance.

Frequency-selective bridge circuits are widely known and are commonly used in narrow band amplifiers and in oscillators. U.S. Patent 2,583,649 issued to William R. Hewlett on January 29, 1952 illustrates a typical use of frequency-selective circuits in electronic oscillators. However, in applications of this type, it is desirable to provide a single variable element in the bridge circuit for making small variations in its selected frequency. This avoids the difficulties usually associated with attempts to vary two bridge elements over a given range with a constant tracking factor. Single variable-element bridge circuits are discussed in the literature. (See: E. R. Wigan, "Single-Control Element Wien Bridge," Electronic Technology, June 1960, pages 223–229.) A practical difficulty encountered in bridge circuits of this type is that one terminal of the variable element cannot be connected at ground potential. This makes it extremely difficult to vary the selected frequency of the bridge using a variable element that is responsive to a control current and also makes it difficult to reduce distributed capacity associated with the case of the variable element operating above ground potential.

Accordingly, it is an object of the present invention to provide a bridge circuit having a single variable element connectable to ground potential.

It is another object of the present invention to provide a bridge circuit having a single grounded variable element which provides a constant signal division ratio at zero phase shift for small variations in the selected frequency.

In accordance with the illustrated embodiment of the present invention a vernier frequency control is provided using a single grounded variable element in a Wien bridge circuit. When used in conjunction with a high gain amplifier to produce oscillations, small variations in the oscillation frequency are made possible without disturbing the bridge balance. The amplitude of the oscillations thus remains unchanged for adjustments of the grounded element. Also, the stray capacitance to surrounding structure and circuitry usually associated with the case of the variable element is materially reduced.

Other and incidental objects of the present invention will be apparent from a reading of this specification and an inspection of the accompanying drawing which shows a schematic diagram of the bridge circuit of the present invention.

Referring to the drawing, there is shown a frequency-selective bridge circuit connected in the feedback path around amplifier 9. The frequency-selective arms of the bridge circuit include capacitor 11 and resistor 13 serially connected between input node 10 and output node 29 to form a first series circuit. Capacitor 15 and variable resistor 17 are serially connected between node 29 and ground node 12 to form a second series circuit. Resistors 19 and 21 are serially connected in shunt with the serially connected capacitor 15 and variable resistor 17. Resistor 23 is connected between the common connection of capacitor 15 and variable resistor 17 and the common connection of resistors 19 and 21. The resistive arms of the bridge circuit include resistors 25 and

27 serially connected between the input node 10 and ground node 12.

Resistors 21 and 23 are so chosen that variations in the amplitude of the signal appearing at nodes 29 and 31 are minimized as variable resistor 17 is adjusted. Thus, the amplitude of the signal appearing between nodes 29 and 31 as variable resistor 17 is varied is constant for a signal having constant amplitude applied to input node 10. In addition, the signal appearing between these nodes has zero phase angle shift with respect to the signal at the selected frequency applied to the input node 10. This relationship holds true for small variations in the frequency selection provided by the adjustment of variable resistor 17. Since the signal division ratio of the frequency-selective arm is constant for any frequency selected by the adjustment of variable resistor 17, the amplitude of the output signal appearing at terminal 32 with respect to ground node 12 also remains constant as variable resistor 17 is adjusted. Where large variations in frequency selection are desired, resistors 13 and 19 may be ganged together and varied simultaneously by the adjustment of a single knob. It should be understood by those skilled in the art that the frequency-selective signal divider of the present invention has many applications either alone or in conjunction with a resistive divider as shown other than in electronic oscillator circuits.

Therefore the circuit of the present invention provides small adjustments in the frequency selection of a frequency-selective signal divider. In addition, the circuit of the present invention provides a constant amplitude output signal from an applied constant amplitude signal having a frequency that is selected by adjusting the variable resistor. Also, the single variable element required in the present invention to make small variations in the selected frequency may be connected at ground potential. This facilitates frequency control using current-responsive variable elements in place of the variable element shown. Further, the problems encountered with the stray capacities usually associated with the case or container of a variable element operating above ground potential are virtually eliminated in the present invention simply by connecting the case of the element to ground.

I claim:

1. A variable frequency-selective circuit comprising a first resistor and first storage element forming a first series circuit, a variable resistor and second storage element forming a second series circuit, a source of reference potential, means serially connecting the first and second series circuits, said variable resistor having one terminal thereof connected to said reference potential, second and third resistors serially connected in shunt with said second series circuit, a fourth resistor connecting the common terminal of said variable resistor and second storage element and the common terminal of said second and third resistors, means to apply signal to the serially connected first and second series circuits at the end thereof remote from said reference potential, and means to derive said output signal from the common terminal of said first and second series circuits.

2. A variable frequency-selective circuit for providing constant amplitude output signal at zero phase shift from an applied constant amplitude signal, said circuit comprising a first resistor and first storage element forming a first series circuit, a variable resistor and second storage element forming a second series circuit, a source of reference potential, means serially connecting the first and second series circuits to receive said constant amplitude signal with respect to said reference potential, said variable resistor having one terminal thereof connected to said reference potential, second and third resistors serially connected in shunt with said second series circuit, a fourth resistor connecting the common terminal of said variable resistor and second storage element and the common terminal of said second and third resistors, and means to derive said output signal from the common terminal of said first and second series circuits.

3. A variable frequency-selective circuit for providing constant amplitude output signal at zero phase shift from an applied constant amplitude signal, said circuit comprising a first resistor and first storage element forming a first series circuit, a variable resistor and second storage element forming a second series circuit, a source of reference potential, means serially connecting the first and second series circuits to receive said constant amplitude signal with respect to said reference potential, said variable resistor having one terminal thereof connected to said reference potential, second and third resistors serially connected in shunt with said second series circuit, a fourth resistor connecting the common terminal of said variable resistor and second storage element and the common terminal of said second third resistors, and means to derive said output signal from the common terminal of said first and second series circuits, the ratio of the value of said fourth resistor to the value of one of the second and third resistors being selected to provide minimum variation in output signal amplitude with variations in the value of said variable resistor.

4. A frequency-selective circuit comprising a first resistor and first storage element forming a first series circuit, a second resistor and second storage element forming a second series circuit, a source of reference potential, means serially connecting the first and second series circuits to receive a signal with respect to said source of reference potential, third and fourth resistors serially connected in shunt with said second series circuit, a fifth resistor connecting the common terminal of said second resistor and second storage element and the common terminal of said third and fourth resistors, and means to derive an output signal from the common terminal of said first and second series circuits.

References Cited by the Examiner

UNITED STATES PATENTS

| | | | |
|---|---|---|---|
| 2,163,403 | 6/1939 | Meacham | 333—75 |
| 2,173,426 | 9/1939 | Scott | 333—75 |
| 2,230,803 | 2/1941 | Klipsch | 333—75 |
| 2,237,407 | 4/1941 | Bruck | 333—75 |
| 2,245,365 | 6/1941 | Riddle | 333—75 |
| 2,341,067 | 2/1944 | Wise | 333—75 |
| 2,495,511 | 1/1950 | Dolberg | 333—75 |

FOREIGN PATENTS

| | | |
|---|---|---|
| 587,714 | 5/1947 | Great Britain. |

ELI LIEBERMAN, *Primary Examiner.*

HERMAN KARL SAALBACH, *Examiner.*

C. BARAFF, *Assistant Examiner.*